Patented Mar. 2, 1943

2,312,879

UNITED STATES PATENT OFFICE 2,312,879

FIBER-FORMING POLYMERS AND METHOD OF MAKING THEM

Robert Edward Christ, Wilmington, Del., assignor to E. I. du Pont de Nemours & Company, Wilmington, Del., a corporation of Delaware No Drawing. Application April 22, 1940,
Serial No. 331,045

17 Claims. (Cl. 260—76)

This invention relates to polymeric materials and more particularly to fiber-forming synthetic polymers.

This invention has as an object a new method for preparing fiber-forming or superpolymers comprising ester and amide groups. A further object is a method in which amino alcohols can be successfully used as a reactant in making these polymers. A still further object is the manufacture of new and improved fiber-forming polymers. Other objects will appear hereinafter.

These objects are accomplished by reacting with heat treatment, in the manner hereinafter more particularly pointed out, a mixture comprising bifunctional polyamide-forming and bifunctional polyester-forming reactants, this mixture containing as the minimum or essential reactants a monoaminomonohydric alcohol, a dibasic carboxylic acid, and a dihydric alcohol and continuing the polymerization reaction until a polymer is formed that can be formed into pliable filaments. Filaments made from the polymers are of such a character that they can be cold drawn into fibers which, as evidenced by X-ray analysis, exhibit molecular orientation along the fiber axis.

In addition to the three reactants mentioned above the mixture may contain other bifunctional reactants, the functional groups of which also interact with those of either or both of the reactive groups in the amino alcohol, the dibasic carboxylic acid, or the glycol to form ester or amide groups. Examples of the reaction mixtures that may be used are:

I. Amino alcohols, dibasic acids and glycols
II. Amino alcohols, dibasic acids, glycols and diamines
III. Amino alcohols, dibasic acids, glycols and amino acids
IV. Amino alcohols, dibasic acids, glycols and hydroxy acids In preparing the ester-amide polymers the reactants should be used in such proportions that the complementary reacting groups are present in substantially equimolecular proportions. Thus, in I the dibasic acid should be used in amount equimolecularly equivalent to the sum of the amino alcohol and glycol, and in II the dibasic acid should be used in amount equimolecularly equivalent to the sum of the amino alcohol, glycol, and diamine, etc. However, a small excess, up to about 5 molar per cent, of the amino alcohol, dibasic acid, glycol or other reactant may be employed to advantage if a viscosity stable polymer is desired, i. e. a polymer which does not undergo material change in viscosity on further heating. A small amount of monoamine or monocarboxylic acid may be used for the same purpose.

The fiber-forming polymers of this invention preferably consist substantially solely of one or more of the above mentioned groups of reactants. For the purposes of the present invention the amino alcohol must be present in substantial amount which is not less than 5 molar percent acid, preferably from 10% to 50%, of the other reactants.

In the preferred practice of the invention in which an amino alcohol having a chain of less than 4 atoms separating the amino and hydroxyl groups is used, as for instance, ethanolamine, the dibasic carboxylic acid selected is one having a radical length, as defined in Patent 2,130,948, of at least 6, and the reaction is carried out by a two stage heat treatment, the first of which is conducted below 180° C., preferably at 150° to 180° C. for at least two hours to effect a substantial degree of polymerization and the second of which may, if necessary or desired, be conducted above 180° C., e. g. at 180° to 250° C., preferably under reduced pressure, to continue the polymerization until the product has a sufficiently high molecular weight to exhibit fiber-forming properties. By conducting the first stages of the reaction below 180° C. the tendency to form cyclic products of the oxazoline or oxazine types instead of linear polymers is avoided. Where the amino alcohol has 4 or more atoms separating the amino and hydroxyl groups the above precautions as to radical length of the dibasic carboxylic acid and mode of heating are less importance since these reactants have little or no tendency to form cyclic products.

It will be apparent therefore that the products of this invention are obtained by heating the above mentioned reaction mixtures under "polymerizing conditions" which means at polymerizing temperatures, and, in the case of amino alcohols having a chain of less than 4 atoms separating the amino and hydroxyl groups, at a temperature below 180° C. for at least the first two hours of the reaction.

It is desirable to have water present during the first stage of the reaction since this renders the reaction mixture homogeneous and decreases frothing. It is desirable during the second stage of the polymerization, which is usually conducted under a pressure of 2 to 4 mm., to agitate the mixture by allowing a stream of nitrogen or carbon dioxide to bubble slowly through the reaction mixture. This prevents oxygen from coming in contact with the reaction mixture and aids in the removal of the by-product, which in most cases will be water.

The fiber-forming stage can be tested for by touching the molten polymer with a rod and drawing the rod away; if this stage has been reached, a continuous filament of considerable strength and pliability is formed. The polymers of this invention do not acquire the properties desired for most uses until they possess fiber-forming and cold drawing properties. In other words, great strength, toughness, flexibility and elasticity appear simultaneously with fiber-forming properties. These properties are generally not reached until the intrinsic viscosity is above 0.3, intrinsic viscosity being defined as in Patent 2,130,948. The best products have intrinsic viscosities above 0.5.

The polymers of this invention are soluble in mixtures of chloroform and methanol. For the most part they are soluble in chloroform alone. They are also readily soluble in phenol and formic acid. Hot ethanol, isopropanol, butanol, acetone and ethyl acetate also act as solvents for the polymers.

The following examples, in which parts are by weight, are illustrative of the preparation and application of the products of this invention.

*Example I*

A mixture of 12.21 parts of ethanolamine, 2.68 parts of pentaglycol [HOCH$_2$C(CH$_3$)$_2$CH$_2$OH], 45.65 parts of sebacic acid, and 10 parts of water was heated for 4 hrs. at 176° C./atm., 8 hrs. at 176° C./20 mm., 7 hrs. at 176° C./2 mm., and finally for 27 hrs. at 200° C./2 mm. The product thus obtained was a clear, transparent, tough polymer which melted at 95° C. and had an intrinsic viscosity of 0.33, a melt viscosity of 2,890 poises at 156° C., and a hardness of 20 g. on the Pfund scale. Oriented films of the polymer had a tensile strength of 14,400 lbs./sq. in. (25,600 lbs./sq. in. based on dimensions at break).

*Example II*

A mixture of 12.21 parts of ethanolamine, 2.85 parts of ethylene glycol, 46.87 parts of sebacic acid, and 10 parts of water was heated for 2 hrs. at 176° C./atm., 8 hrs. at 176° C./20 mm., 32 hrs. at 176° C./2 mm., and finally for 16 hrs. at 200° C./2 mm. The product thus obtained was a clear, transparent, tough polymer which melted at 92° C., and had an intrinsic viscosity of 0.37, and a hardness of 22 g. on the Pfund scale. Oriented films of the polymer had a tensile strength of 15,650 lbs./sq. in. (19,300 lbs./sq. in. based on dimensions at break).

*Example III*

A mixture of 12.21 parts of ethanolamine, 12.41 parts of ethylene glycol, 25.00 parts of hexamethylene diammonium adipate, 80.86 parts of sebacic acid, and 10.00 parts of water was heated for 8 hrs. at 170° C./atm., 8 hrs. at 170° C./20 mm., and finally for 4 days at 170° C./2 mm. The product thus obtained was a clear, tough, pliable polymer which melted at 84° C., and had an intrinsic viscosity of 0.43. Oriented films thereof had a tensile strength of 5,880 lbs./sq. in. on the original dimensions (8,460 lbs./sq. in. at break).

*Example IV*

A mixture of 12.21 parts of ethanolamine, 12.41 parts of ethylene glycol, 20.00 parts of epsilon-aminocaproic acid, 80.86 parts of sebacic acid, and 10.00 parts of water was heated for 8 hrs. at 170° C./atm., 8 hrs. at 170° C./20 mm., and finally for 4 days at 170° C./2 mm. The product thus obtained was a clear, tough, flexible polymer which melted at 52° C., and had an intrinsic viscosity of 0.43. Oriented films thereof had a tensile strength of 7,780 lbs./sq. in. on the original dimensions (11,700 lbs./sq. in. at break).

*Example V*

A mixture of 12.21 parts of ethanolamine, 12.41 parts of ethylene glycol, 10.00 parts of omega-hydroxymyristic acid, 80.86 parts of sebacic acid and 10.00 parts of water was heated for 8 hrs. at 170° C./atm., 8 hrs. at 170° C./20 mm., and finally for 4 days at 170° C./2 mm. The product thus obtained was a clear, tough, flexible polymer which melted at 76° C., and had an intrinsic viscosity of 0.49. Oriented films thereof had a tensile strength of 11,400 lbs./sq. in. on the original dimensions (15,480 lbs./sq. in. at break).

The amino alcohols are preferably those of the formula HO—R—NH$_2$, where R represents a saturated divalent hydrocarbon radical with a chain length of at least two carbon atoms. Amino alcohols of this kind in addition to ethanolamine are 3-aminopropanol, 4-aminobutanol, 6-aminohexanol, 10-aminodecanol, and

p-NH$_2$CH$_2$—C$_6$H$_4$—CH$_2$OH

Branched chain amino alcohols of formula

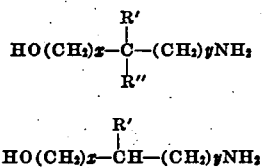

and may also be used, where $x$ and $y$ are integers and R′ and R″ are monovalent hydrocarbon radicals. Amide-forming derivatives of the amino alcohols, e. g. the N-formyl derivatives thereof, may be used in place of the amino alcohols.

The dibasic acids are preferably those of formula HOOC—R—COOH where R represents a saturated divalent hydrocarbon radical with a chain length of at least four carbon atoms. Dibasic acids such as terephthalic acid and HOOCCH$_2$CH$_2$CH$_2$SCH$_2$CH$_2$CH$_2$COOH may also be used. Where the amino alcohol used has four or more atoms in the chain separating the amide-forming groups, dibasic acids having a shorter chain separating the carboxyl groups may also be employed, examples being malonic and glutaric acids.

The preferred glycols are those of formula HOROH where R is a divalent hydrocarbon radical, typical examples being trimethylene glycol, p—HOCH$_2$—C$_6$H$_4$—CH$_2$OH, hexamethylene glycol and decamethylene glycol. However, such glycols as diethylene glycol, triethylene glycol, and HOCH$_2$CH$_2$—S—CH$_2$CH$_2$OH may be also be used.

The diamines most useful in the practice of this invention are those of the formula NH$_2$RNH$_2$ where R represents saturated divalent hydrocarbon radicals with a chain length of at least two carbon atoms. These diamines include ethylenediamine, hexamethylenediamine, 3-methylhexamethylenediamine, and decamethylenediamine. However, aromatic diamines such as m-phenylenediamine may also be used. Diamines containing hetero atoms in the chain separating the amino groups may also be used, a typical example being 3,3'diaminodipropyl ether. Amide-forming derivatives of the diamines, e. g. the N-formyl or N,N'-diformyl derivatives, may also be used.

When hydroxy acids are used, the best results are obtained with those of the formula HO—R—COOH where R represents saturated divalent hydrocarbon radicals. Examples of these acids are ω-hydroxycaproic, ω-hydroxydecanoic, and ω-hydroxymyristic acid.

The preferred amino acids are those of formula NH₂RCOOH or amide-forming derivatives thereof, where R is a divalent hydrocarbon radical having a chain of at least 5 atoms, examples being 6-aminocaproic acid, caprolactam, 9-aminononanoic acid, and 11-aminoundecanoic acid. 12-aminostearic acid is another example of a suitable amino acid.

It is to be understood that the amino alcohols, dibasic acids, glycols, diamines, hydroxy acids, and amino acids mentioned above may be replaced by suitable amide-forming or ester-forming derivatives of these compounds. This applies also to the appended claims.

It should be noted that amino alcohols contain both an amide-forming and an ester-forming group. Polymers formed by the reaction of amino alcohols, dibasic acids and glycols therefore contain both amide and ester groups as an integral part of the main chain of atoms in the polymer chain. These ester-amide polymers have better solubility characteristics than those prepared without the use of an amino alcohol, for example, those prepared from a dibasic acid, glycol and diamine. Thus ester-amide polymers prepared without the use of an amino alcohol and having an amide content of 50% are practically insoluble in all ordinary organic solvents, whereas those of the type herein described are soluble in many common organic solvents, e. g. chloroform, butanol, and alcohol-chloroform mixtures. In contrast to ester-amide polymers prepared without the use of a glycol but from the other reactants used to make the polymers of this invention including the amino alcohol, the polymers of the present invention have lower melting points. This enhances their utility as adhesives.

On hydrolysis with mineral acids the polymers of this invention revert to monomeric amide-forming and ester-forming reactants. For example, a polymer derived from an amino alcohol, a glycol and a dibasic acid will yield, on hydrolysis with hydrochloric acid, a mixture comprising an amino alcohol hydrochloride, a glycol, and a dibasic acid.

The unusual solubility of the polymers of this invention in mixed solvents such as methanol and chloroform makes them valuable as film-forming materials and as ingredients in coating and impregnating compositions for wood, cloth, leather, paper, etc. They are also useful as adhesives and binding agents. Due to their unusual toughness, pliability and clarity, they are advantageously used in the preparation of fibers and safety glass interlayers. The present polymers are also useful as electrical insulation for wires, cables, and for the windings on motors and dynamo-electric machines. These polymers are in general microcrystalline in structure rather than resinous. By reason of the fact that cold drawn filaments of the polymers tend to retract when heated they are useful in making felted articles. It is to be understood that in these and other uses the polymers may be admixed with other materials such as plasticizers, pigments, dyes, resins and cellulosic materials.

As many apparently widely different embodiments of this invention may be made without departing from the spirit and scope thereof, it is to be understood that I do not limit myself to the specific embodiments thereof except as defined in the appended claims.

I claim:

1. A process for making polymers which comprises heating a reaction mixture comprising essentially bifunctional reactants which comprise a monoaminomonohydric alcohol in which the amino nitrogen carries at least one hydrogen atom, a dibasic carboxylic acid and a glycol, under polymerizing conditions and continuing the heating until a polymer is formed which can be formed into pliable filaments, the carboxyl groups in said mixture of bifunctional reactants being present in amount substantially equimolecularly equivalent to the sum of the amino and alcoholic hydroxyl groups.

2. The process set forth in claim 1 in which said amino alcohol has a chain of at least four atoms separating the amino and hydroxyl groups.

3. A process for making polymers which comprises heating at reaction temperatures but below 180° C. a reaction mixture comprising essentially bifunctional reactants which comprise a glycol, a monoaminomonohydric alcohol in which the amino nitrogen carries at least one hydrogen atom and which has a chain of less than four atoms separating the amino and hydroxyl groups, and a dibasic carboxylic acid having a radical length of at least six and then heating the low molecular weight polymer thus obtained at polymerizing temperatures until a polymer is formed which can be formed into pliable filaments, the carboxyl groups in said mixture of bifunctional reactants being present in amount substantially equimolecularly equivalent to the sum of the amino and alcoholic hydroxyl groups.

4. A process for making polymers which comprises heating a reaction mixture comprising essentially bifunctional reactants which comprise ethanolamine, a glycol and a dibasic carboxylic acid having a radical length of at least six at 150° to 180° C. until most of the reactants have combined, and then heating the low molecular weight polymer thus obtained at 180°–250° C. until a polymer is formed which is capable of being formed into fibers which by characteristic X-ray patterns exhibit orientation along the fiber axis, the carboxyl groups in said mixture of bifunctional reactants being present in amount substantially equimolecularly equivalent to the sum of the amino and alcoholic hydroxyl groups.

5. A process for making polymers which comprises heating a reaction mixture comprising essentially bifunctional reactants which comprise a monoaminomonohydric alcohol in which the amino nitrogen carries at least one hydrogen atom, a dibasic carboxylic acid, a glycol and water for at least two hours at a temperature of 150° to 180° C., and then continuing the heating at polymerizing temperatures under reduced pressure until the polymer can be drawn into fibers exhibiting by X-ray patterns orientation along the fiber axis, the carboxyl groups in said mixture of bifunctional reactants being present in amount substantially equimolecularly equivalent to the sum of the amino and alcoholic hydroxyl groups.

6. A process for making polymers which comprises heating a reaction mixture comprising essentially bifunctional reactants which comprise a monoaminomonohydric alcohol in which the amino nitrogen carries at least one hydrogen atom, a dibasic carboxylic acid, a glycol and a diamine, in which each amino nitrogen carries at least one hydrogen atom, under polymerizing conditions until a polymer is formed which can be formed into fibers showing by characteristic X-ray patterns orientation along the fiber axis, the carboxyl groups in said mixture of bifunctional reactants being present in amount substantially equimolecularly equivalent to the sum of the amino and alcoholic hydroxyl groups.

7. A polymer capable of being formed into pliable fibers, said polymer comprising the reaction product of reactants comprising essentially bifunctional reactants which comprise a monoaminomonohydric alcohol in which the amino nitrogen carries at least one hydrogen atom, a dibasic carboxylic acid, and a glycol, the carboxyl groups in said mixture of bifunctional reactants being present in amount substantially equimolecularly equivalent to the sum of the amino and alcoholic hydroxyl groups.

8. The polymer set forth in claim 7 in which said amino alcohol has a chain of at least four atoms separating the amino and hydroxyl groups.

9. A polymer comprising the reaction product of reactants comprising essentially bifunctional reactants which comprise a monoaminomonohydric alcohol in which the amino nitrogen carries at least one hydrogen atom, a dibasic carboxylic acid having a radical length of at least six, and a glycol, the carboxyl groups in said mixture of bifunctional reactants being present in amount substantially equimolecularly equivalent to the sum of the amino and alcoholic hydroxyl groups, said polymer being capable of being formed into pliable filaments.

10. A polymer comprising the reaction product of reactants comprising essentially bifunctional reactants which comprise ethanolamine, a dibasic carboxylic acid having a radical length of at least six, and a glycol, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

11. A polymer comprising the reaction product of reactants comprising essentially bifunctional reactants which comprise a monoaminomonohydric alcohol in which the amino nitrogen carries at least one hydrogen atom, a dibasic carboxylic acid, a glycol, and a diamine, in which each amino nitrogen carries at least one hydrogen atom, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

12. A fiber-forming polymer which yields on hydrolysis with hydrochloric acid a mixture comprising essentially bifunctional reactants which comprise a dibasic carboxylic acid, a glycol, and the hydrochloride of a monoaminomonohydric alcohol in which the amino nitrogen carries at least one hydrogen atom, the carboxyl groups in said mixture of bifunctional reactants being present in amount substantially equimolecularly equivalent to the sum of the amino and alcoholic hydroxyl groups.

13. A polymer comprising the reaction product of reactants comprising essentially bifunctional reactants which comprise a monoaminomonohydric alcohol in which the amino nitrogen carries at least one hydrogen atom, a dibasic carboxylic acid, a glycol, and a monoaminomonocarboxylic acid in which the amino nitrogen carries at least one hydrogen atom, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

14. A polymer comprising the reaction product of reactants comprising essentially bifunctional reactants which comprise a monoaminomonohydric alcohol in which the amino nitrogen carries at least one hydrogen atom, a dibasic carboxylic acid, a glycol, and a monohydroxymonocarboxylic acid, the carboxyl groups in said mixture of bifunctional reactants being present in amount substantially equimolecularly equivalent to the sum of the amino and alcoholic hydroxyl groups, said polymer being capable of being formed into fibers exhibiting by characteristic X-ray patterns orientation along the fiber axis.

15. The process set forth in claim 3 in which said monoaminomonohydric alcohol is ethanolamine.

16. A polymer set forth in claim 7 in which said monoaminomonohydric alcohol is ethanolamine.

17. A polymer set forth in claim 7 in which said monoaminomonohydric alcohol is ethanolamine and said glycol is ethylene glycol.

ROBERT EDWARD CHRIST.